US008056008B2

(12) United States Patent
Castrucci (10) Patent No.: US 8,056,008 B2
(45) Date of Patent: Nov. 8, 2011

(54) INTERACTIVE OBJECT PROPERTY REGION FOR GRAPHICAL USER INTERFACE

(75) Inventor: Adam Castrucci, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 2031 days.

(21) Appl. No.: 10/940,326

(22) Filed: Sep. 14, 2004

(65) Prior Publication Data

US 2006/0055670 A1    Mar. 16, 2006

(51) Int. Cl.
*G06F 3/048* (2006.01)
(52) U.S. Cl. ......... 715/715; 715/791; 715/808; 715/809
(58) Field of Classification Search .................. 715/700, 715/715, 791, 808, 809
See application file for complete search history.

(56) References Cited

U.S. PATENT DOCUMENTS

| | | | |
|---|---|---|---|
| 4,768,028 A * | 8/1988 | Blackie | 345/8 |
| 5,491,783 A * | 2/1996 | Douglas et al. | 715/846 |
| 5,977,948 A * | 11/1999 | Nishibori | 715/841 |
| 5,995,101 A | 11/1999 | Clark et al. | |
| 6,049,335 A * | 4/2000 | Iida | 715/811 |
| 6,078,935 A | 6/2000 | Nielsen | |
| 6,185,591 B1 * | 2/2001 | Baker et al. | 715/210 |
| 6,307,544 B1 * | 10/2001 | Harding | 715/709 |
| 6,437,800 B1 | 8/2002 | Malamud et al. | |
| 6,563,514 B1 * | 5/2003 | Samar | 715/711 |
| 6,683,633 B2 * | 1/2004 | Holtzblatt et al. | 715/854 |
| 7,092,934 B1 * | 8/2006 | Mahan et al. | 1/1 |
| 7,152,207 B1 * | 12/2006 | Underwood et al. | 715/207 |
| 7,207,009 B1 * | 4/2007 | Aamodt et al. | 715/772 |
| 7,272,818 B2 * | 9/2007 | Ishimitsu et al. | 717/108 |
| 2001/0038395 A1 * | 11/2001 | Holtzblatt et al. | 345/854 |
| 2002/0052941 A1 * | 5/2002 | Patterson | 709/223 |
| 2002/0062326 A1 | 5/2002 | Sellen et al. | |

(Continued)

FOREIGN PATENT DOCUMENTS

JP    09167058 A  *  6/1997

OTHER PUBLICATIONS

Robert Cowart, Mastering Windows 95, 1995, Sybex, pp. 41-42, 217-219, 487-493.*

(Continued)

*Primary Examiner* — Boris Pesin
*Assistant Examiner* — John Heffington
(74) *Attorney, Agent, or Firm* — Robert C. Kowert; Meyertons, Hood, Kivlin, Kowert & Goetzel, P.C.

(57) ABSTRACT

An interactive object property region displayable in a graphical user interface for an application program is disclosed. The interactive object property region is preferably automatically generated in response to a mouse pointer being moved over the object, but may also be affirmatively selected. Preferably, the region is initially positioned proximate to the object when generated. The interactive object property region, preferably a window, displays one or more properties of the selected object, and is interactive in the sense that the user can edit the displayed values in the region without the need to access further menu options in the graphical user interface. For example, in a preferred embodiment, the pointer can be moved from the object to the region to automatically change the displayed properties from a static display to an editable mode. Alternatively, the displayed property as soon as they are generated or can be editable upon affirmative selection.

49 Claims, 7 Drawing Sheets

U.S. PATENT DOCUMENTS

| | | | |
|---|---|---|---|
| 2002/0111813 A1* | 8/2002 | Capps | 705/1 |
| 2002/0198909 A1* | 12/2002 | Huynh et al. | 707/513 |
| 2003/0037304 A1 | 2/2003 | Burky | |
| 2003/0051209 A1 | 3/2003 | Androski et al. | |
| 2003/0101413 A1* | 5/2003 | Klein et al. | 715/513 |
| 2003/0107607 A1* | 6/2003 | Nguyen | 345/863 |
| 2003/0187854 A1* | 10/2003 | Fairweather | 707/10 |
| 2003/0229845 A1* | 12/2003 | Salesin et al. | 715/500 |
| 2004/0039628 A1* | 2/2004 | Thompson et al. | 705/9 |
| 2004/0044723 A1* | 3/2004 | Bell et al. | 709/203 |
| 2004/0056875 A1 | 3/2004 | Jaeger | |
| 2004/0145601 A1* | 7/2004 | Brielmann et al. | 345/708 |
| 2004/0189694 A1* | 9/2004 | Kurtz et al. | 345/738 |
| 2004/0205711 A1* | 10/2004 | Ishimitsu et al. | 717/116 |
| 2004/0207658 A1 | 10/2004 | Awada et al. | |
| 2004/0230599 A1* | 11/2004 | Moore et al. | 707/102 |
| 2004/0236441 A1* | 11/2004 | Melideo | 700/83 |

OTHER PUBLICATIONS

Robert Cowart, "Mastering Windows 95," Sybex, 1995, 14 pages.
FreeTimeFOTO, Using Photoshop Brush Palette, May 10, 2007, 11 pages
ATCS, "Using Adobe Acrobat 6 to Complete a Form," 2004, 2 pages.

* cited by examiner

FIG. 6

INTERACTIVE OBJECT PROPERTY REGION FOR GRAPHICAL USER INTERFACE

FIELD OF THE INVENTION

The subject matter of the present disclosure relates to an interactive object property region for a user to change properties of an object in a graphical user interface.

BACKGROUND OF THE INVENTION

Figure 1:
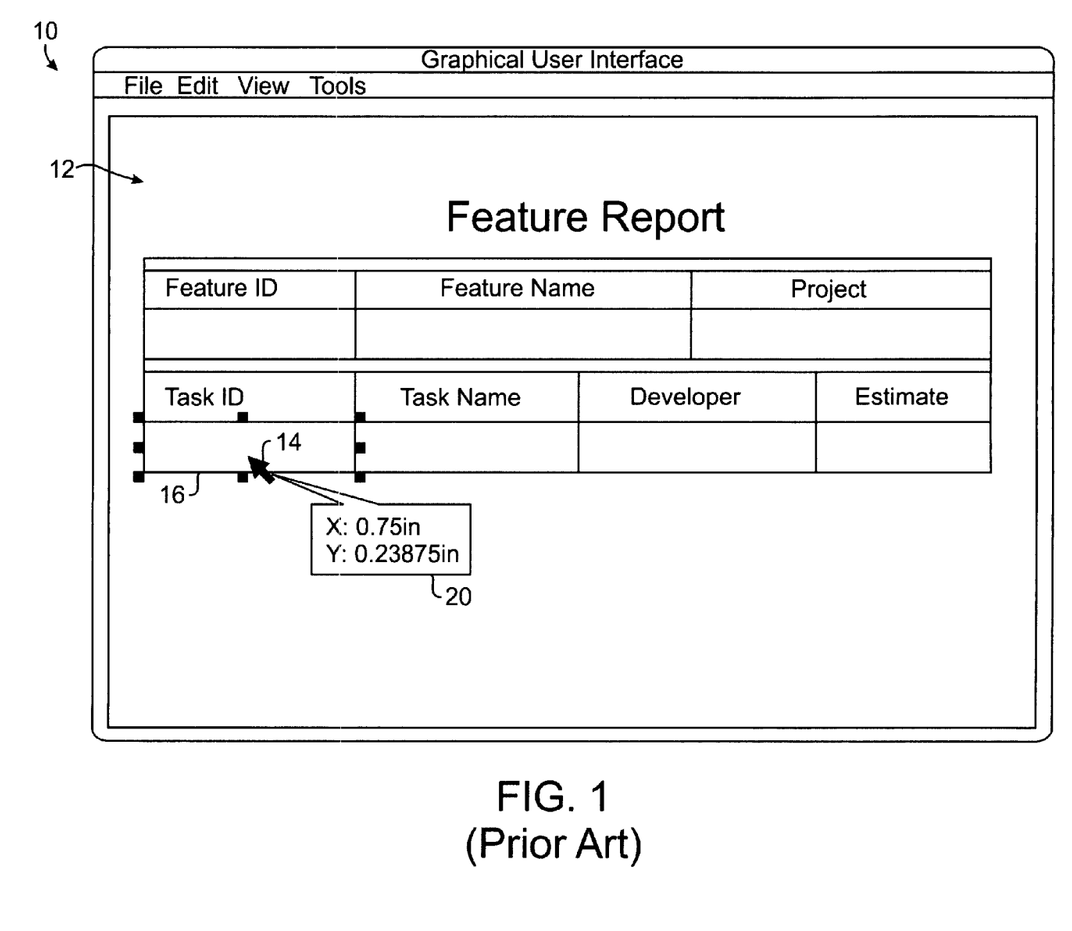
FIG. 1 illustrates a prior art popup displaying information about an object adjacent a pointer.

Pop-ups (also known as balloons or tips) are known in the art and are used in Microsoft Windows® application programs and in computer aided drafting application programs, for example. Referring to FIG. 1, a graphical user interface 10 of the prior art has a canvas 12 displaying a plurality of objects. In the present example, the interface 10 is a drawing program for building a form, and the objects on the canvas 12 include boxes, fields, text, etc. As shown in FIG. 1, a user has used a mouse pointer 14 to select and highlight an object 16, in this example a box, and a pop-up 20 according to the prior art is displayed adjacent the pointer 14, which comprises a displayable element or window within the graphical user interface 10. The pop-up 20 provides information about the selected object 16. For example, the pop-up 20 in FIG. 1 shows the object's X-Y coordinates on the canvas 12.

Figure 2A:
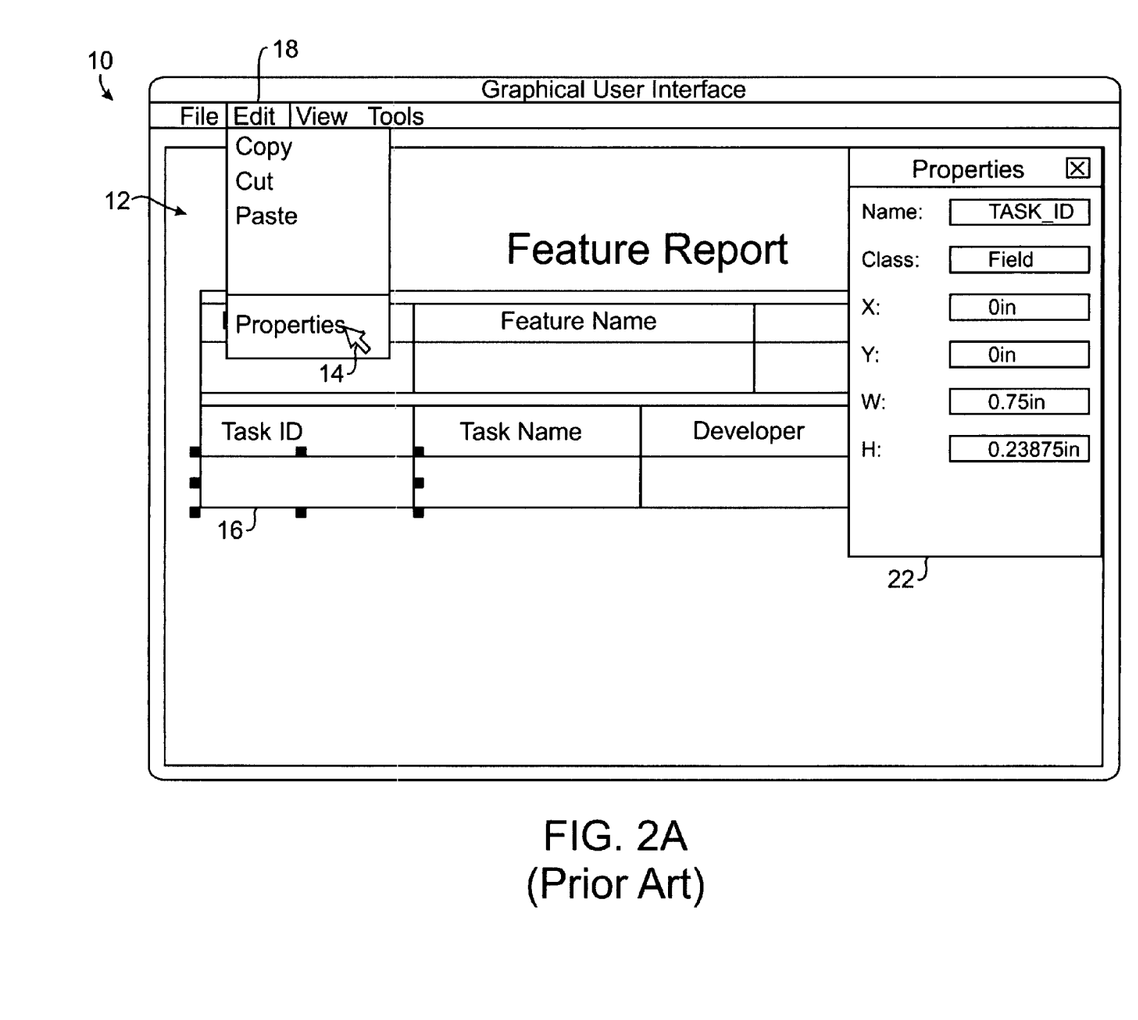
FIGS. 2A-2B illustrate prior art methods for accessing property information concerning an object using a dialog box.
Figure 2B:
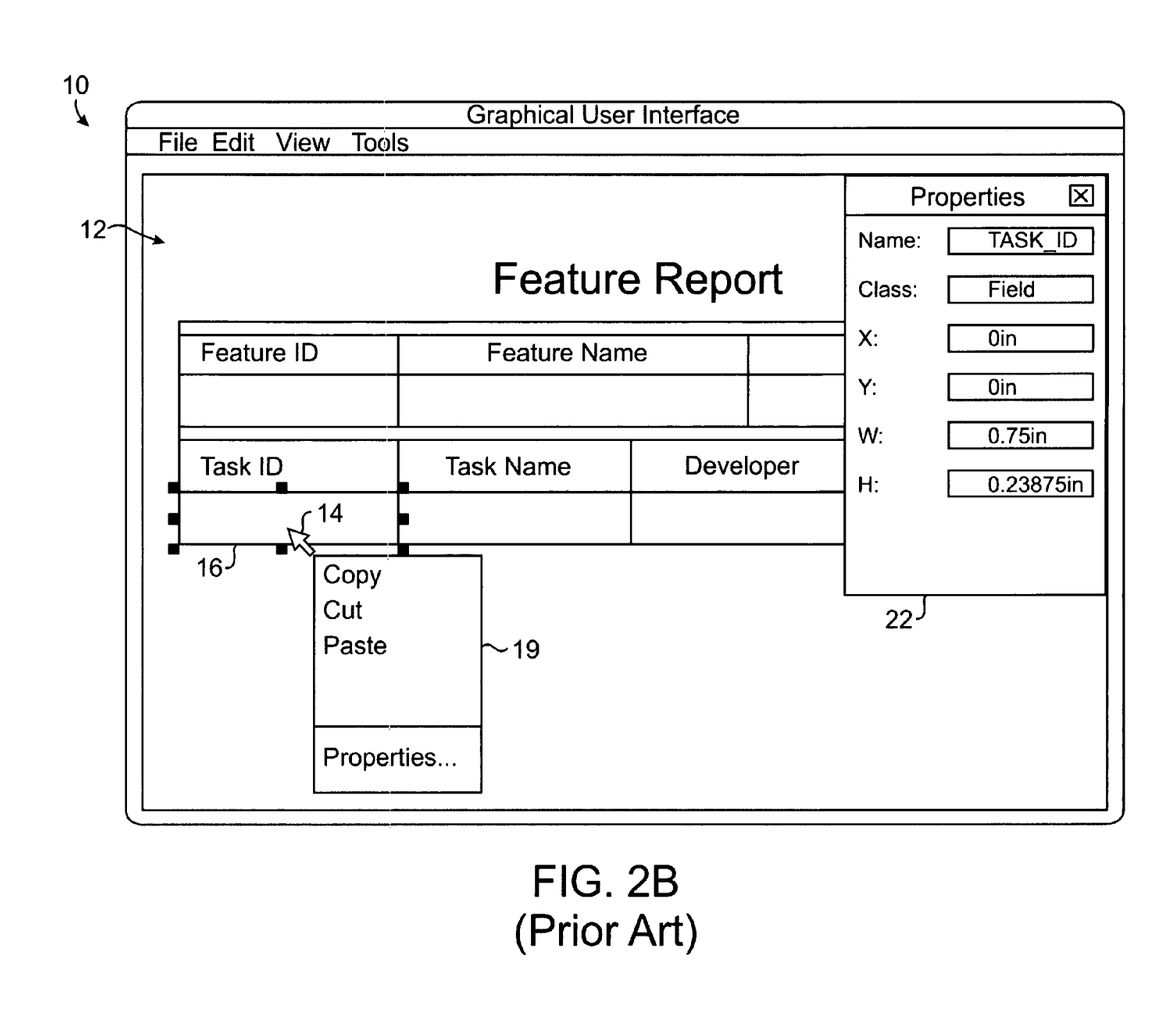

When working with the graphical user interface 10, the user may wish to change a property (size, height, width, color, X-Y coordinates, font, etc.) of the selected object 16. However, the pop-up 20 is static, and the user cannot interact with the pop-up 20. In addition, the pop-up 20 typically disappears immediately after the user moves the mouse pointer 14 away from the object 16 or soon afterwards. To change a property of the selected object 16, the user must affirmatively select an option of the graphical user interface 10 using, for example, a menu. Referring to FIGS. 2A-2B, typical menu operations are illustrated that allow a user to access and change property information of the selected object 16. In one type of menu operation shown in FIG. 2A, the user, after highlighting the object in question, accesses a dropdown menu 18 on the toolbar of the interface 10 using the mouse pointer 14. In another type of menu operation shown in FIG. 2B, the user accesses a dropdown menu 19 after right-clicking with a mouse on the selected object 16.

On these menus 18 or 19, the user typically selects "prop­erties . . . " with the mouse pointer 14, and a dialog box 22 is thereafter displayed on the canvas 12. The user can then change properties of the selected object 16 using text fields in the dialog box 22. As shown in FIGS. 2A-2B, the dialog box 22 can be "docked," meaning that the dialog box 22 can be fixed in a set persistent position on the canvas 12 (usually to the side), although such prior art dialog boxes have also been made moveable and non-persistent on the canvas. Such dialog boxes 22 are typically used in drawing programs, such as Adobe Illustrators, and several of such dialog boxes can be opened and docked at one time on the canvas 12. The docked dialog box 22 must be independently closed to remove it from the canvas 12, such as by selecting the "X" button at the top of the box. Furthermore, the dialog boxes 22 occupy valuable space of the canvas 12 by overlapping existing objects on the canvas 12 or by reducing the size of the canvas 12 to fit the docked dialog box 22 in the interface 10.

To enter changes to properties of the selected object 16, the user must move the pointer 14 from the selected object 16 to the dialog box 22 and edit a property value in fields of the dialog box 22. To continue working with the objects in the canvas 12 after such editing, the user must then move the pointer 14 back to the objects displayed on the rest of the canvas 12. If the user selects another object 16 in the canvas 12, the dialog box 22 typically remains docked in the canvas 12 and changes to reflect the properties of the newly selected object 16. Again however, the user must move the pointer 14 from the selected object 16 to the dialog box 22 to change a property, and then move the pointer 14 to the objects to continue working.

Using the conventional menu operations and dialog boxes 22 to change object property information as described above can inconvenience the user. For example, changing properties of a selected object requires repeated selection of objects and movements to and from the dialog box 22 to enter changes. In addition, the dialog box 22 obscures the view of the canvas 12 and must be independently closed to remove the box 22 from the canvas 12.

The subject matter of the present disclosure is directed to overcoming, or at least reducing the effects of, one or more of the problems set forth above.

SUMMARY OF THE DISCLOSURE

An interactive object property region displayable in a graphical user interface for an application program allows a user to change the properties of an object. The interactive object property region is preferably automatically generated in response to a mouse pointer being moved over the object, but may also be affirmatively selected, such as by clicking a mouse button while the pointer is over the object. Preferably, the region is initially positioned proximate to the object when generated, and remains proximate to the object for a predetermined amount of time absent further interaction by the user.

The interactive object property region, preferably a window, displays one or more properties of the selected object, and is interactive in the sense that the user can edit the displayed values in the region without the need to access further menu options in the graphical user interface. For example, in a preferred embodiment, the pointer can be moved from the object to the region to automatically change the displayed properties from a static display to an editable mode. Alternatively, the displayed property in the interactive object property region can be already editable when the region is first generated, or can be made editable by an affirmative selection of the displayed property, such as a mouse click while the pointer is over the displayed property. In further embodiments, the user can drag the interactive object property region to other locations on the canvas of the interface, and/or make the region persistent on the canvas.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

While the disclosed interactive object property region is susceptible to various modifications and alternative forms, specific embodiments are shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Figure 3:
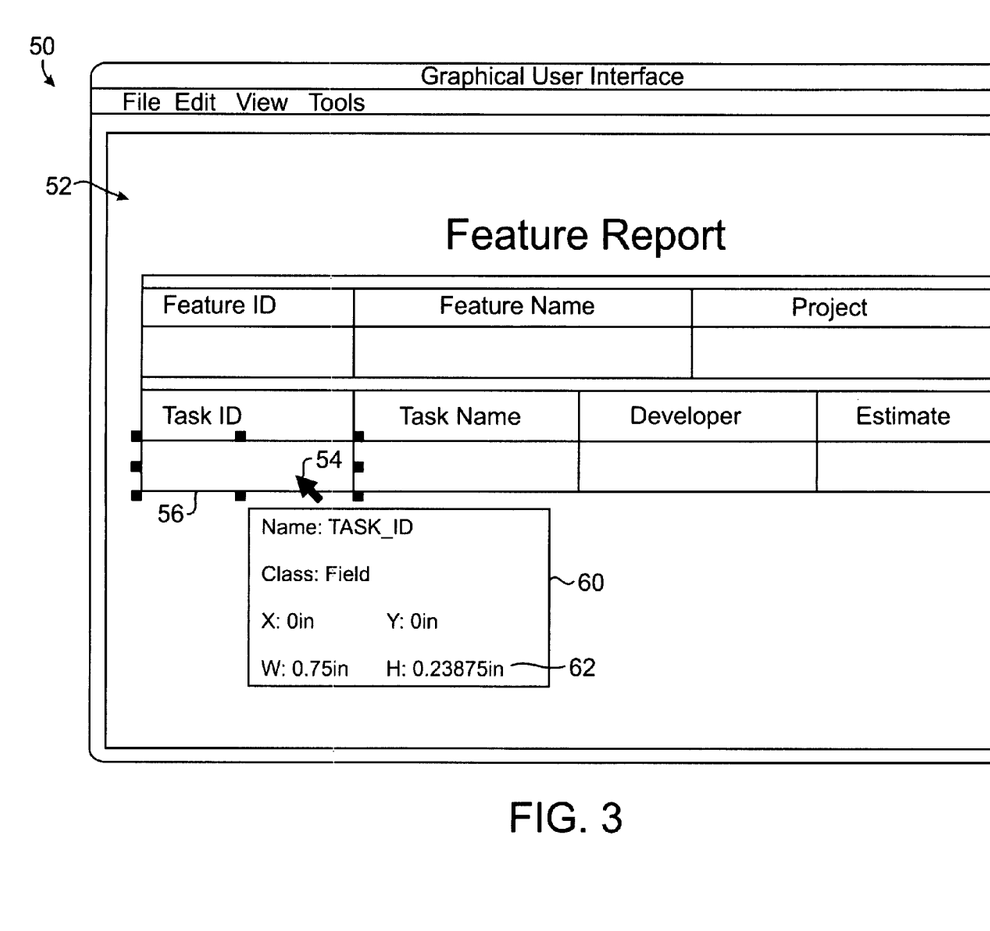
FIG. 3 illustrates an interactive object property region according to the present disclosure displayed proximate to a selected object.

Referring to FIG. 3, a graphical user interface 50 for an application program (such as a form builder) has a mouse pointer 54 to allow the user to interact with the interface 50 as is well known. In the canvas 52 of the interface 50, the user can move the pointer 54 and interact with an object 56, again in this example a box.

In useful embodiments of the invention, the user can access and change property information concerning the object 56 by interacting with an interactive object property region 60, which is preferably a window. In one embodiment, the interactive object property region 60 is generated when the user selects the object 56. Such selection can occur in any number of ways. For example, the user can affirmative select the object 56 to generate the interactive object property region 60 by clicking a button on the computer's mouse while the pointer 54 is over the object 56. (As one skilled in the art will understand, such functionality can either be an automatic feature of the application program or can be made user programmable, e.g., through access to a drop down menu on the toolbar to program either the right or left mouse buttons to generate the region 60). If clicking on the object 56 is already reserved for some other function, generation of the interactive object property region 60 can involve pressing a key on the computer's keyboard, or clicking on the object 56 while simultaneously with pressing a key on a keyboard, etc.

However, in a preferred embodiment, selection of the object 56 to generate the interactive object property region 60 automatically occurs when the pointer 54 is moved over the object 56 (e.g., when a "mouse-over" event occurs). To detect a mouse-over event, "hit testing" is performed as the pointer 54 is moved within the canvas 52 to determine if the pointer 54 is over a new object 56, with such hit testing techniques being well known in the art. When a hit test returns true, the interactive object property region 60 is automatically displayed and is populated with relevant information for the particular object 56 selected.

In the case where the canvas 52 contains several overlapping objects, and in a preferred embodiment, the interactive object property region 60 is generated for the top-most or foreground-most object 56 on the canvas. To access a background object, the user may use an affirmative selection, such as using a mouse click or the computer's keyboard as described above.

Once generated, the interactive object property region 60 is preferably positioned proximate to the selected object 56 or pointer 54. The close proximity of the region 60 to the object 56 allows the region 60 to be directly associated with the selected object 56, and aids in editing the displayed properties in the region 60 as will be explained later. Specifically, the close proximity of the region 60 to the pointer 54 is convenient because need only move the pointer 54 a short distance to interact with region 60 as discussed below. In an alternative embodiment, the interactive object property region 60 can be positioned elsewhere in the canvas 52 once generated. In either case, the interactive object property region 60 may disappear if the user does not move the pointer 54 over the region 60 within a predetermined amount of time (e.g., a few seconds), if the pointer 54 has moved a predetermined distance from the object 56, or if the pointer 54 has moved over a new object on the canvas 52. Again, both the positing of the interactive object property region 60 relative to the selected object 56 as well as the conditions under which it disappears can be automatically set by the application program, or can be made user programmable. In a preferred embodiment, the application program is cognizant of the location of other objects on the canvas 52, and will attempt to display the interactive object property region 60 proximate to the selected object 56 without obscuring the view of other objects when possible.

As noted above, the interactive object property region 60 displays property information about the selected object 56. Because in the present example the application program is a program for building a form, logical object properties which a user might like to change are displayed in the interactive object property region 60, such as the object's name, class, X-Y coordinates, width, and height. However, the various properties displayed in region 60 can be those automatically determined to be most commonly used, or can be made user programmable in accordance with user preferences. For example, the preferences can include, but are not limited to, the graphical aspects of the region 60, the choice of information to be displayed in the region 60, and the interactive nature of the region 60, such as discussed below.

In addition to displaying property information of the selected object 56, the interactive object property region 60 is interactive and can be used to change the displayed properties 62 of the object 56. Thus, between FIGS. 3 and 4 the pointer 54 has been moved from the object 56 to the now-displayed interactive object property region 60. In a preferred embodiment, moving the pointer 54 in this fashion causes the interactive object property region 60 to remain and not disappear, although again this is not necessarily required as the region 60 can disappear after a longer period of time (e.g., 30 seconds), after the pointer 54 is moved outside of the region 60, or otherwise in accordance with user programming, etc.

Figure 4:
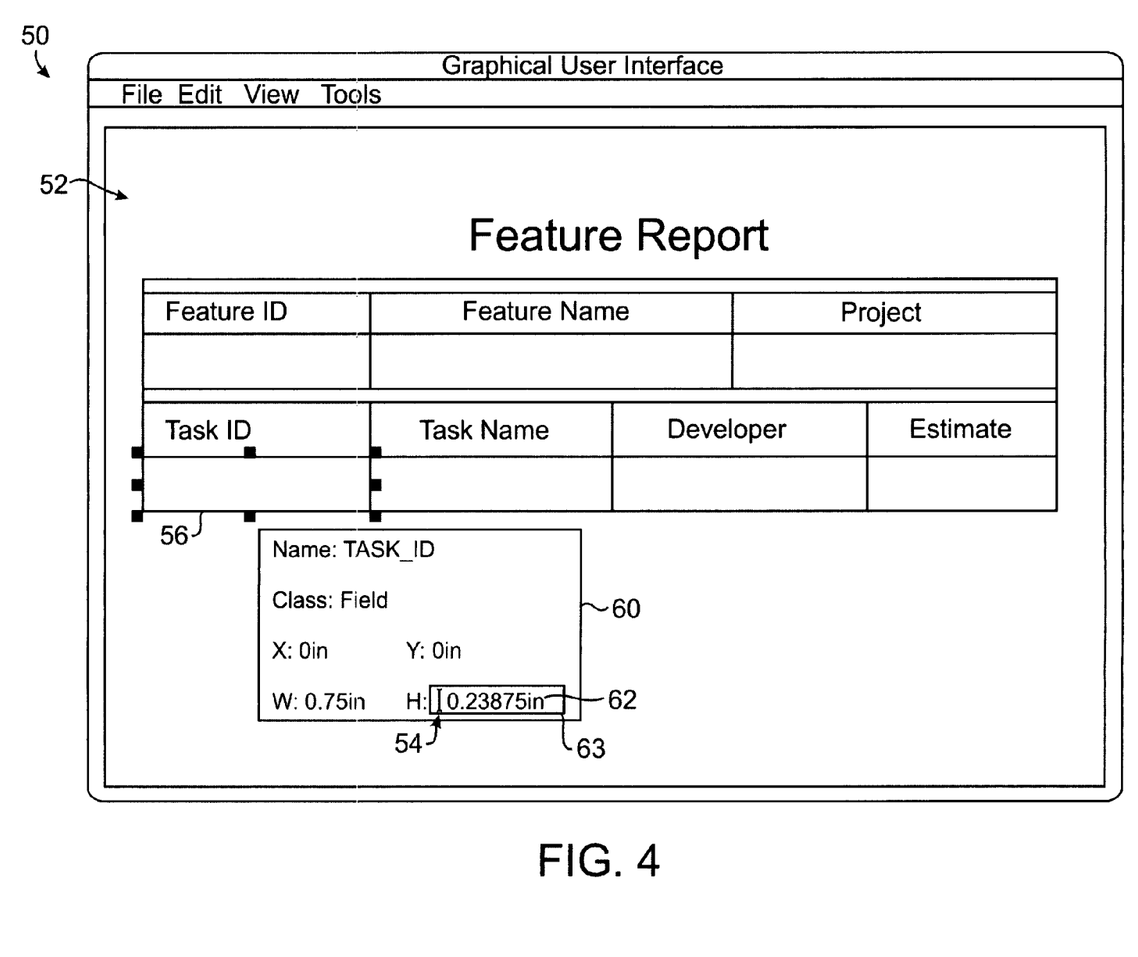
FIG. 4 illustrates editing of property information in the interactive object property region of FIG. 3.

In a preferred embodiment, a displayed property 62 in the interactive object property region 60 becomes automatically editable when the pointer 54 is moved over a particular displayed property 62. For example, the pointer 54 changes to an editing cursor (e.g., an I-bar) when moved over displayed property 62, and an editable text field 63 appears in the region 60 where the displayed property 62 is located. Again, hit testing can be used to determine this mouse over condition. Alternatively, mousing over the region 60 can cause all displayed properties to likewise become editable. In another alternative embodiment, the displayed properties can become editable when the user performs an affirmative selection, such as by clicking with mouse pointer 54, use of the keyboard, or combinations of these events, etc. Thus, a particular displayed property 62 can be made editable through affirmative selection of that property, or all displayed properties can be made editable through affirmative selection anywhere in the region 60. In a further alternative, all of the displayed properties in the interactive object property region 60 can already be in editable mode when the region 60 is first generated, and without the need of mousing over from the object 56 to the region 62. Again, these techniques are only exemplary, and may be made user programmable.

When in an editable mode, a characteristic of the displayed property 62 (or all of the displayed properties) preferably changes in the user interface to make clear to the user that the property 62 is editable. For example, the font or color of the displayed property 62 can be changed to highlight that the property 62 is editable, and/or text fields 63 may appear. In addition to changing properties by free text entry, the interactive object property region 60 can employ dropdowns, buttons, checkboxes, commands, scrollbars, and other graphical and textual devices to allow the user to edit and change the displayed property 62 (or properties).

Once the edits to the property (or properties) have been made, they can be effectuated in any number of ways. If only a single property is being edited by free text entry, that edit can become effective to change the property once the text is input and, for example, the region 60 is exited such as by pressing a key on the keyboard (such as the "enter" or "tab" key), etc. If properties are being changed using check boxes or drop down menus, they can become effective upon selection. Alternatively, if several displayed properties can be edited, a user can enter all of the necessary edits, and then select an "apply" button present within the interactive object property region 60 to effectuate all changes at one time (not shown). Of course, after the edit or edits has been effectuated, it is preferred that the object 56's appearance will be accordingly updated within the canvas 52 (assuming the property is graphical in nature), although such updating can also occur at a later time (such as once the region 60 is made to disappear). Again, these means for effectuating the edits to the interactive object property region 60 are merely exemplary, and can vary and/or be made user programmable.

Once the displayed property 62 (or properties) has been effectuated, the interactive object property region 60 can be made to disappear in any number of ways. First, the region 60 can disappear automatically once the edit is effectuated in any of the ways just mentioned. However, preferably, the region 60 will remain present for some period of time after the edit is (or edits are) effectuated, e.g., to allow changes to be made to other displayed properties if desired. Alternatively, the interactive object property region 60 can remain displayed until the user moves the pointer 54 outside of the region 60; until the user moves the pointer 54 outside the region 60 for some time (e.g., a couple of seconds); until the user clicks a mouse button while the pointer 54 is outside of the region 60; and/or until the user moves the pointer 54 to a new object, thus displaying a new interactive object property region for that new object. Such actions alternatively can merely return the interactive object property region 60 to a non-editable mode instead of causing the region 60 to disappear, which might then require the user to move the pointer 54 back into the region 60 or onto the object 56 if he desires the region 60 to continue to be displayed. The interactive object property region 60 can also be closed by selecting a "close" button (see, e.g., button 65, FIG. 6). Assuming no edits are made or effectuated to any of the displayed properties, or otherwise if the user has not interacted with the region 60, the region 60 will preferably disappear a few seconds after it is displayed.

Figure 5:
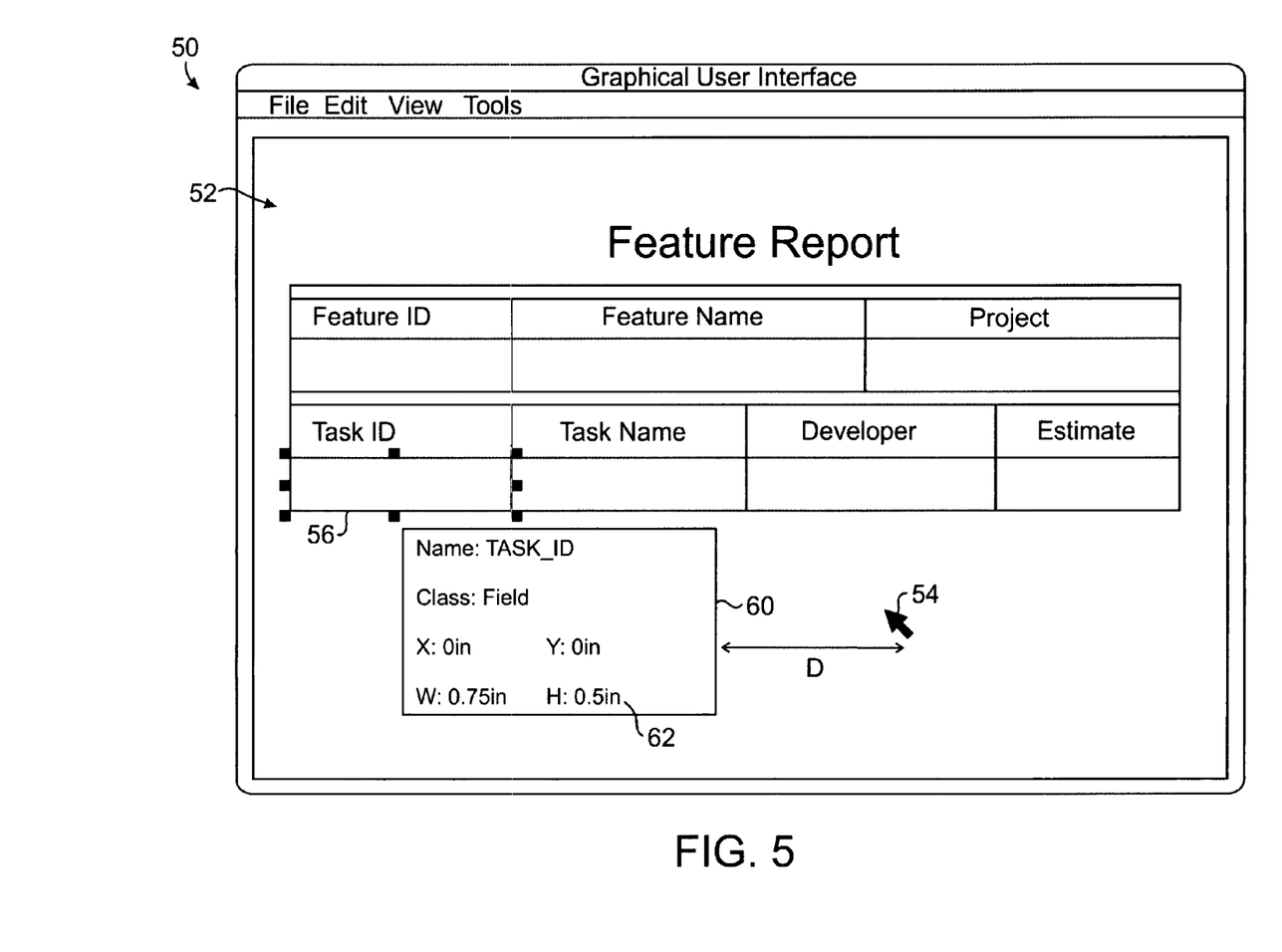
FIG. 5 illustrates the interactive object property region after property information has been edited and the pointer is moved away from the region.

In another embodiment, and referring to FIG. 5, the interactive object property region 60 can remain visible as long as the pointer 54 is within a certain distance D from the region 60 or the selected object 56. The distance D can be half of the height or width of the canvas 52, for example. When the pointer 54 is moved beyond that distance D, the interactive object property region 60 disappears. Such a distance provides the user a comfortable zone in which to move the pointer 54 to interact with the region 60 without it disappearing inadvertently if the pointer moves outside of the region 60 by only a slight margin. This distance also allows the user to easily quickly close the interactive object property region 60 by zooming the mouse pointer off to the edge of the canvas 52.

Figure 6:
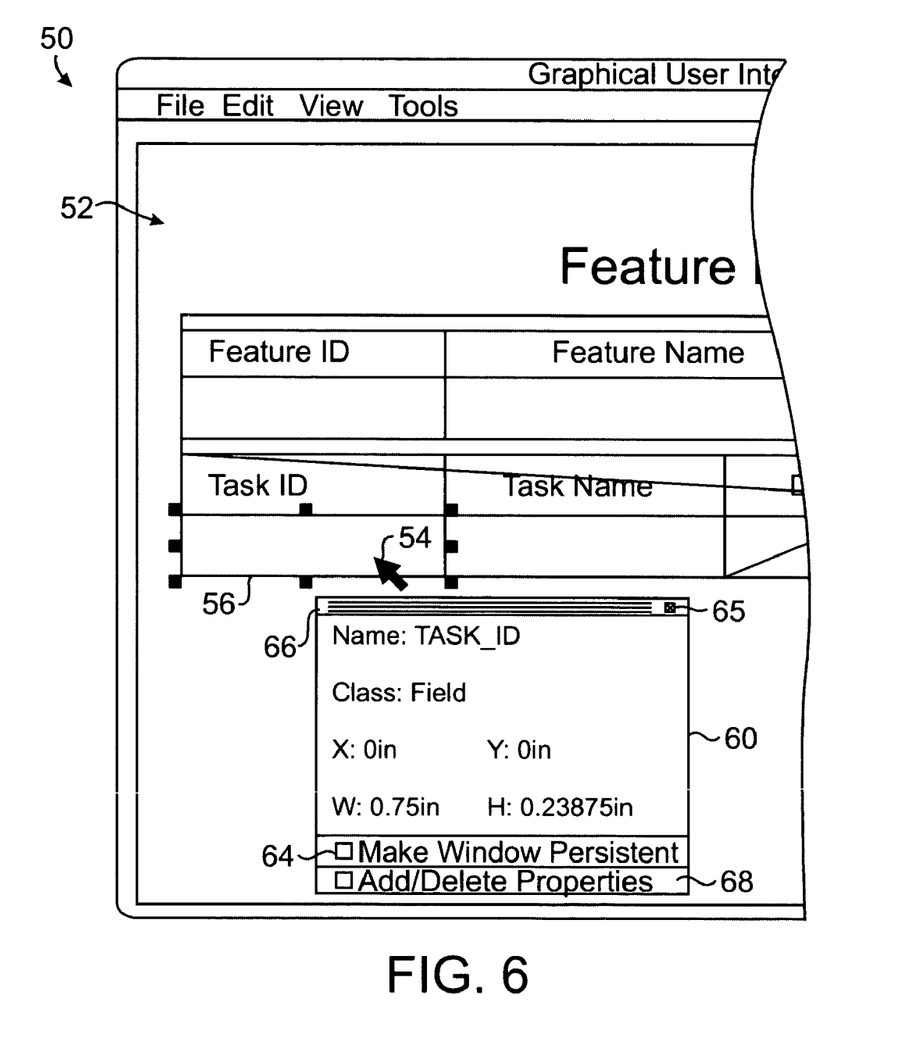
FIG. 6 illustrates an embodiment of the interactive object property region allowing the pointer to drag the region to a new location on the canvas, allowing the user to make the region persistent, and allowing the user to affirmatively select or control the properties to be displayed in the region.

FIG. 6 illustrates still other embodiments of the interactive object property region 60 having additional features. In one feature, the region 60 includes a persistence control 64, which allows the user to make the region 60 persistent on the canvas 52. After selecting the persistence control 64, the region 60 will remain fixed at its location and will not disappear until it is independently closed by the user (e.g., by closing the region 60 with button 65). The persistence control 64 allows the user to keep the region 60 on the canvas 52 when the user intends on making repeated property changes to the selected object 56 or to other future objects, for example. In another feature, the interactive object property region 60 includes a grab region 66. The user can move the pointer 54 to the grab region 66, click and hold a button on his mouse, and move the region 60 to a new location on the canvas 52. Use of the grab region 66 is this fashion is convenient, for example, in the case that the region 60 obscures the view of other objects on the canvas 52. The ability to move the region 60 using the grab region 66 is also particularly useful if the persistence control 64 has been activated, as the user can then place the now-persistent region at a convenient location on the canvas 52, such as at its edge.

In yet another feature, the interactive object property region 60 includes an "add/delete properties" control 68, which allows the user to program which properties 62 will be displayed in the region 60. By selecting the control 68, the user can access a checklist or other menu for specifying the desired properties to be displayed in the region 60. In one embodiment, the control 68 can be configured to display the selected properties for only the selected object 56, with other objects continuing to generate and display interactive object property region in accordance with their configured properties. In another embodiment, the control 68 can be configured to apply the selected properties with respect to all future displayed interactive object property regions 60.

The foregoing disclosed interactive object property regions and their accompanying user interfaces and other functional aspects are easily programmable, and such programming would be a routine matter to a computer programmer of skill using any of a variety of different programming languages in the context of many different operating systems. Of course, the interactive object property regions disclosed herein would be ultimately coded and stored on a computer-readable media, such as a compact disk, a tape, stored in a volatile or non-volatile memory, etc.

As evidenced herein, the interactive object property region 60 allows a user to easily change object properties without using obstructive dialog boxes of the prior art and with minimal steps as the user is not required to independently open a dialog box using with menu operations. Instead, the interactive object property region 60 preferably appears automatically, and further appears proximate to the pointer 54 or selected object 56 so that the user is not required to move the pointer 54 very far to change properties of the selected object 56. Furthermore, the interactive object property region 60 can be configured to display only the most commonly-edited properties or those preferred by the user, thereby reducing the need for the user to have a plurality of docked dialog boxes open on the canvas 52. Consequently, the interactive object property region 60 conserves space on the canvas 52 and reduces the time and difficulty required for the user to change object properties.

It will be appreciated that the interactive object property region 60 can be used with other types of application programs, such as word processing programs, drawing programs, photo editing programs, etc. Of course, the properties to be display in the region 60 will logically depend on the types of objects at issue and on the particular type of applications program in which the regions 60 are used. For example, if the applications program is a word processing program, a pertinent object could be a paragraph or even a single word, and the region 60 could be used to display and allow interactive editing of the paragraph's justification properties, the word's font or font size, etc. If the application program is an illustration program, a pertinent object could be a line or box for example, and the region 60 could be used to display and allow interactive editing of the line's width, the box's fill, etc. Although disclosed as being interactive through common input devices such as a mouse (and possibly a keyboard), it should be appreciated that other input devices, such as a microphone or a touch screen, can also be employed to edit the properties 62 in the region 60.

In another useful embodiment, the interactive object property region 60 need not appear proximate to the selected object 56, but instead can appear directly over the object 56. In this circumstance, it might be unnecessary to move the pointer 54 over the region 60 to allow for editing, as the pointer 54 would already be in position over the region 60 by virtue of its position over the object 60, and editing could begin automatically. While potentially obscuring the view of the object, this alternative might save steps as the region 60 is rendered automatically editable as soon as it is generated without having to move the pointer 54.

While disclosed in the context of a traditional computer, it should be understood that the disclosed methods are not so limited. For example, the disclosed methods can have applicability with respect to other devices such as handheld devices (Personal Data Assistants, cell phones, etc.) and other multimedia devices (such as televisions, etc.). Moreover, while the pointer is disclosed as being a traditional mouse pointer, the pointer may take additional forms as well, such as styluses, touchscreens, lasers, and other cursor or pointer positioners.

An "object" as used herein should be understood as being distinct from the graphical user interface or other tools which might also be present in an application program and used to display and work on the object. As used herein, an "object" denotes data structures within a document or work file in the application program, but does not constitute components of the graphical user interface or other tools used by the application program.

The "property" of an object as referred to in this disclosure can comprise either a property affecting the display of the object in the graphical user interface (such as its size, color), information indicative of the content of the object, or information concerning the object itself (such as its metadata, name, etc.).

The foregoing description of preferred and other embodiments is not intended to limit or restrict the scope or applicability of the inventive concepts disclosed. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of allowing a user to change the properties of an object in a graphical user interface for a computer, the method comprising:
   positioning a pointer over the object, wherein said positioning the pointer over the object causes the display of the at least one property value to occur automatically; and
   subsequently positioning the pointer over the displayed at least one property value, wherein said positioning the pointer over the property value automatically causes the property value to transition from a static state to an editable state.

2. The method of claim 1, further comprising changing the at least one property value using a computer input device.

3. The method of claim 2, wherein the input device is selected from the group consisting of a keyboard, a microphone, a touch screen, a stylus, a cursor positioner, and a mouse.

4. The method of claim 1, wherein the pointer comprises a mouse pointer controlled by a computer mouse.

5. The method of claim 1, wherein the at least one property value is displayed in a displayable region proximate to the object.

6. The method of claim 1, wherein positioning the pointer over the displayed at least one property value to allow the property value to be changed comprises changing the pointer to an editing cursor.

7. The method of claim 1, wherein positioning the pointer over the displayed at least one property value to allow the property value to be changed comprises changing a display characteristic of the displayed property value.

8. The method of claim 1, wherein the property value comprises a property affecting the display of the object in the graphical user interface.

9. The method of claim 1, wherein the property value comprises information indicative of the content of the object.

10. The method of claim 1, wherein the property value comprises information concerning the object.

11. A method for allowing a user to change the properties of an object in a graphical user interface for a computer, comprising:
    positioning a pointer over the object, and in response generating a displayed region containing at least one property value concerning the object, wherein said positioning causes the display of the at least one property value to occur automatically; and
    subsequently, positioning the pointer over the displayed region, wherein said positioning the pointer over the displayed region automatically causes the property value to transition from a static state to an editable state.

12. The method of claim 11, wherein the displayed region is generated proximate to the object.

13. The method of claim 11, wherein the pointer comprises a pointer controlled by a mouse.

14. The method of claim 11, wherein positioning the pointer over the displayed region to allow the at least one property value to be changed comprises moving the pointer over the displayed at least one property value.

15. The method of claim 11, wherein allowing the at least one property value to be changed comprises changing the pointer to an editing cursor.

16. The method of claim 11, wherein positioning the pointer over the displayed region further comprises changing a display characteristic of the displayed at least one property value.

17. The method of claim 11, further comprising automatically eliminating the displayable region upon occurrence of a condition.

18. The method of claim 11, further comprising allowing the user to affirmatively select that the displayed region become persistent.

19. The method of claim 11, further comprising moving the displayed region within the graphical user interface.

20. The method of claim 11, wherein the property value comprises a property affecting the display of the object in the graphical user interface.

21. The method of claim 11, wherein the property value comprises information indicative of the content of the object.

22. The method of claim 11, wherein the property value comprises information concerning the object.

23. A method to change the property values of an object in a graphical user interface for a computer, comprising:
   automatically generating an object property region proximate to the object in response to positioning a mouse pointer over the object, wherein the object property region displays at least one property value concerning the object; and
   automatically transitioning the at least one property value from a static state to an edit state in response to positioning the mouse pointer over the object property region.

24. The method of claim 23, wherein positioning the mouse pointer over the object property region further comprises changing the mouse pointer to an editing cursor.

25. The method of claim 23, wherein changing one property value comprises changing a display characteristic of the displayed object.

26. The method of claim 23, further comprising eliminating the object property region after a predetermined amount of time.

27. The method of claim 23, further comprising automatically eliminating the object property region upon the occurrence of a condition.

28. The method of claim 23, further comprising allowing the user to affirmatively select that the object property region become persistent.

29. The method of claim 23, further comprising allowing the object property region to be moved within the graphical user interface using the mouse pointer.

30. The method of claim 23, wherein said automatically transitioning comprises moving the pointer over the displayed at least one property value.

31. The method of claim 23, wherein the property value comprises a property affecting the display of the object in the graphical user interface.

32. The method of claim 23, wherein the property value comprises information indicative of the content of the object.

33. The method of claim 23, wherein the property value comprises information concerning the object.

34. A computer-readable medium containing a program for performing a method of allowing a user to change the property values of an object in a graphical user interface for a computer, the method comprising:
   positioning a pointer over the object, wherein said positioning the pointer over the object causes the display of the at least one property value to occur automatically; and
   subsequently, positioning the pointer over the displayed at least one property value wherein said positioning the pointer over the property value automatically causes the property value to transition from a static state to an editable state.

35. The computer-readable medium of claim 34, wherein the pointer comprises a mouse pointer controlled by a computer mouse.

36. The computer-readable medium of claim 34, wherein the at least one property value is displayed in a displayable region proximate to the object.

37. The computer-readable medium of claim 34, wherein positioning the pointer over the displayed at least one property value to allow the property value to be changed comprises changing the pointer to an editing cursor.

38. The computer-readable medium of claim 34, wherein positioning the pointer over the displayed at least one property value to allow the property value to be changed comprises changing a display characteristic of the displayed property value.

39. A computer-readable medium containing a program for performing a method of allowing a user to change the properties of an object in a graphical user interface for a computer, the method comprising:
   positioning a pointer over the object, and in response generating a displayed region containing at least one property value concerning the object, wherein generating the displayed region occurs automatically in response to positioning the pointer over the object; and
   subsequently positioning the pointer over the displayed region, wherein said positioning the pointer over the displayed region automatically causes the one property value to transition from a static state to an editable state.

40. The computer-readable medium of claim 39, wherein the displayed region is generated proximate to the object.

41. The computer-readable medium of claim 39, wherein the pointer comprises a pointer controlled by a mouse.

42. The computer-readable medium of claim 39, wherein positioning the pointer over the displayed region to allow the at least one property value to be changed comprises moving the pointer over the displayed at least one property value.

43. The computer-readable medium of claim 39, wherein allowing the at least one property value to be changed comprises changing the pointer to an editing cursor.

44. The computer-readable medium of claim 39, wherein positioning the pointer over the displayed region further comprises changing a display characteristic of the displayed at least one property value.

45. A computer-readable medium containing a program for performing a method to change the properties of an object in a graphical user interface for a computer, the method comprising:
   automatically generating an object property region proximate to the object in response to positioning a mouse pointer over the object, wherein the object property region displays at least one property value concerning the object; and
   automatically transitioning the state of the at least one property value from a static state to an edit state in response to positioning the mouse pointer over the object property region.

46. The computer-readable medium of claim 45, wherein positioning the mouse pointer over the object property region further comprises changing the mouse pointer to an editing cursor.

47. The computer-readable medium of claim 45, wherein said automatically transitioning comprises changing a display characteristic of the displayed at least one property value.

48. The computer-readable medium of claim 45, further comprising automatically eliminating the object property region upon the occurrence of a condition.

49. The computer-readable medium of claim 45, wherein transitioning the at least one property value from a static state to an edit state in response to positioning the mouse pointer over the object property region comprises moving the pointer over the displayed at least one property value.

* * * * *